(12) United States Patent
Goncharov et al.

(10) Patent No.: US 11,459,640 B2
(45) Date of Patent: Oct. 4, 2022

(54) HIGH GAMMA PRIME NICKEL BASED SUPERALLOY, ITS USE, AND METHOD OF MANUFACTURING OF TURBINE ENGINE COMPONENTS

(71) Applicant: Liburdi Engineering Limited, Dundas (CA)

(72) Inventors: Alexander B. Goncharov, Mississauga (CA); Joseph Liburdi, Dundas (CA); Paul Lowden, Dundas (CA)

(73) Assignee: Liburdi Engineering Limited, Dundas (CA)

( * ) Notice: Subject to any disclaimer, the term of this patent is extended or adjusted under 35 U.S.C. 154(b) by 118 days.

(21) Appl. No.: 16/744,952

(22) Filed: Jan. 16, 2020

(65) Prior Publication Data

US 2021/0130932 A1 May 6, 2021

(51) Int. Cl.
| | | |
|---|---|---|
| *C22C 19/05* | (2006.01) | |
| *B33Y 70/00* | (2020.01) | |
| *C22F 1/10* | (2006.01) | |
| *B33Y 10/00* | (2015.01) | |
| *B33Y 80/00* | (2015.01) | |

(52) U.S. Cl.
CPC .......... *C22C 19/057* (2013.01); *B33Y 70/00* (2014.12); *C22C 19/055* (2013.01); *C22C 19/056* (2013.01); *C22F 1/10* (2013.01); *B33Y 10/00* (2014.12); *B33Y 80/00* (2014.12)

(58) Field of Classification Search
CPC ........ C22F 1/10; C22C 19/056; C22C 19/057
See application file for complete search history.

(56) References Cited

U.S. PATENT DOCUMENTS

| | | |
|---|---|---|
| 2,901,374 A | 8/1959 | Gundlach |
| 4,288,247 A | 9/1981 | Shaw |
| 7,014,723 B2 | 3/2006 | Beck et al. |
| 8,992,669 B2 | 3/2015 | Ikeda et al. |
| 8,992,700 B2 | 3/2015 | Bain et al. |

FOREIGN PATENT DOCUMENTS

| | | |
|---|---|---|
| CN | 105492639 A | 4/2013 |
| EP | 1795621 B1 | 6/2007 |

OTHER PUBLICATIONS

Gontcharov et al., GT2018-75862, "Advanced Welding Materials and Technologies for Repair of Turbine Engine Components manufactured of High Gamma Prime Nickel Based Superalloys", Proceedings of ASME Turbo Expo 2018: Turbine Technical Conference and Exposition, GT2018, Jun. 11-15, 2018, Oslo, Norway (further GT2018-75862).

Dikran A. Barhanko et al., "Development of Blade Tip Repair for SGT-700 Turbine Blade Stage 1, With Oxidation Resistant Weld Alloy", Proceedings of ASME Turbo Expo 2018, Turbomachinery Technical Conference and Exposition, GT2018, Jun. 11-15, 2018, Oslo, Norway.

W. Ross and Kevin S O'Hara for René 142 in "Rene 142: High Strength, Oxidation Resistance DS Turbine Airfoil Alloy", Superalloys 1992, pp. 257-265.

*Primary Examiner* — Jessee R Roe
(74) *Attorney, Agent, or Firm* — Ridout & Maybee LLP

(57) ABSTRACT

The specification relates to a high gamma prim nickel based superalloy, its use and a method of manufacturing of turbine engine components by welding, 3D additive manufacturing, casting and hot forming, and the superalloy comprises by wt %: from 9.0 to 10.5% Cr, from 16 to 22% Co, from 1.0 to 1.4% Mo, from 5.0 to 5.8% W, from 2.0 to 6.0% Ta, from 1.0 to 4.0% Nb provided that total content of Ta and Nb remains with a range from 3.0 to 7.0%, from 3.0 to 6.5% Al, from 0.2 to 1.5% Hf, from 0.01 to 0.2% C, from 0 to 1.0% Ge, from 0 to 1.0 wt. % Si, from 0 to 0.2 wt. % Y, from 0 to 0.015 wt. % B, from 1.5 to 3.5 wt. % Re, and nickel with impurities to balance.

4 Claims, 11 Drawing Sheets

HIGH GAMMA PRIME NICKEL BASED SUPERALLOY, ITS USE, AND METHOD OF MANUFACTURING OF TURBINE ENGINE COMPONENTS

CROSS-REFERENCE TO RELATED APPLICATION

This application claims the benefit of and priority to Chinese Patent Application No. 201911060106.X filed Nov. 1, 2019 under the title HIGH GAMMA PRIME NICKEL BASED SUPERALLOY, ITS USE, AND METHOD OF MANUFACTURING OF TURBINE ENGINE COMPONENTS. The content of the above patent application is hereby expressly incorporated by reference into the detailed description hereof.

FIELD

The present disclosure relates to high gamma prime (γ') nickel-based superalloy can be used for laser beam (LBW), plasma (PAW), micro-plasma (MPW), gas tungsten arc welding (GTAW), electron beam (EBW) welding and 3D additive manufacturing (AM), as well as for manufacturing of turbine engine components and other articles by casting and hot forming.

BACKGROUND

Most turbine blades of aero and industrial turbine engines are manufactured from nickel based high gamma-prime (γ') superalloys that have unique combination of oxidation and creep properties. However, despite remarkable properties of high γ' superalloys, engine components frequently require various weld repairs due to creep and thermo-mechanical fatigue cracking, oxidation and hot corrosion damage occurring during operation of turbine engines. Dissimilar cobalt based Merl 72 (M72), nickel based René 142 (R142) and René 80 (R80) welding materials have been used for a repair of high (HPT) and low (LPT) pressure turbine blades from 1980-s, refer to A. Gontcharov et al, GT2018-75862, "Advanced Welding Materials and Technologies for Repair of Turbine Engine Components manufactured of High Gamma Prime Nickel Based Superalloys", Proceedings of ASME Turbo Expo 2018: Turbine Technical Conference and Exposition, GT2018, Jun. 11-15, 2018, Oslo, Norway (further GT2018-75862) (incorporated herein by reference).

Cobalt based M72 has excellent weldability, ductility and oxidation resistance but low creep properties at temperatures ≥1800° F. as shown in GT2018-75862 and Example 1, which resulted in a premature HPT blades failure and unscheduled engine removals. Low creep properties are typical for most cobalt based alloys and nickel-based superalloys with high cobalt content. On the other hand, high γ' nickel based R142 welding wire, which comprises 6.8 wt. % Cr-12 wt. % Co-1.5 wt. % Mo-4.9 wt. % W-6.4 wt. % Ta-6.1 wt. % Al-1.5 wt. % Hf-2.8 wt. % Re, that was disclosed by Earl W. Ross and Kevin S. O'Hara "Rene 142: High Strength, Oxidation Resistance DS Turbine Airfoil Alloy", Superalloys 1992, pp. 257-265 and created based on the high gamma prime nickel based superalloy as per U.S. Pat. No. 4,169,742 that comprised of: 10-13 wt. % Co, 3-10 wt. % Cr, 0.5-2 wt. % Mo, 3-7 wt. % W, 0.5-10 wt. % Re, 5-6 wt. % Al, 5-7 wt. % Ta, 0.5-2 wt. % Hf, 0.01-0.15 wt. % C, 0.005-0.05 wt. % B, 0-0.1 wt. % Zr with nickel to balance, has excellent creep properties, but extremely poor weldability. Limited weld repairs of turbine engine components with R142 have been done only with the preheating of engine components to high temperature as it was demonstrated by Dikran A. Barhanko et al, "Development of Blade Tip Repair for SGT-700 Turbine Blade Stage 1, With Oxidation Resistant Weld Alloy", Proceedings of ASME Turbo Expo 2018, Turbomachinery Technical Conference and Exposition, GT2018, Jun. 11-15, 2018, Oslo, Norway and Alexandre Gontcharov et al in the previously quoted GT2018-75862 article. However, even with the preheating, R142 welds demonstrated poor ductility and high propensity to microcracking such that it is unable to use R142 for 3D additive manufacturing.

Nickel based superalloy R80 with the chemical composition as per U.S. Pat. No. 3,615,376, which comprises Ni-15% Cr-9.5% Co-5% Ti-4% W-4% Mo-3% Al-0.17% C, has better weldability but poor oxidation resistance and can't substitute R142 and M72.

Nickel based superalloys disclosed in CN 105492639, CA 28004402, U.S. Pat. Nos. 4,288,247, 7,014,723, 8,992,669, and 8,992,700 with elevated to 20-30% Co content can't substitute the high gamma prime R142 superalloy as well due to insufficient mechanical properties at ≥1800° F. despite potentially better weldability.

Therefore, there are substantial needs in the development of new high oxidation resistance, high strength and ductility high gamma prime nickel-based superalloys that can help to produce crack free welds on single crystal (SX) materials at an ambient temperature for repair and 3D AM of turbine engine components.

BRIEF DESCRIPTION OF THE INVENTION

We have found that the high gamma prime nickel-based superalloy comprising by wt. % from 9.0 to 10.5% Cr, from 16 to 22% Co, from 1.0 to 1.4% Mo, from 5.0 to 5.8% W, from 2.0 to 6.0% Ta, from 1.0 to 4.0% Nb provided that total content of Ta and Nb remains with a range from 3.0 to 7.0%, from 3.0 to 6.5% Al, from 0.2 to 1.5% Hf, from 0.01 to 0.2% C, from 0 to 1.0% Ge, from 0 to 1.0 wt. % Si, from 0 to 0.2 wt. % Y, from 0 to 0.015 wt. % B, from 1.5 to 3.5 wt. % Re, and nickel with impurities to balance, has excellent weldability at an ambient temperature, good combination of mechanical and oxidation properties and can be used for various repairs of turbine engine components by a fusion welding and for the manufacturing of turbine engine components by 3D AM, casting, and hot forming.

In a particular embodiments, the amount of each element can be varied independently of the other elements. For instance, the high gamma prime nickel-based superalloy can contain:

Cr having a range (in wt. %) from 9.3-10.5, 9.6-10.5, 9.9-10.5, 9.0-10.2, 9.3-10.2, 9.6-10.2, 9.0-9.9, 9.6-9.9, 9.5-10 or 9.5-10.5, or variations thereof:

Co having a range (in wt. %) from 16-21; 16-20; 16-19; 17-22; 17-21; 17-20; 17-19; 18-22; 18-21; 18-20; or 18-19, or variations thereof:

Mo having a range (in wt. %) from 1.0-1.3; 1.0-1.2; 1.1-1.4; 1.1-1.3; 1.1-1.2; 1.2-1.4; or 1.2-1.3, or variations thereof;

W having a range (in wt. %) from 5.1-5.8; 5.2.-5.8; 5.3-5.8, 5.4-5.8, 5.0-5.7, 5.1-5.7; 5.2.-5.7; 5.3-5.7, 5.4-5.7, 5.0-5.6, 5.1-5.6; 5.2.-5.6; 5.3-5.6, 5.4-5.6, 5.0-5.5, 5.1-5.5; 5.2.-5.5; 5.3-5.5, or 5.4-5.5, or variations thereof;

Ta having a range (in wt. %) from 2.5-6.0, 3.0-6.0, 3.5-6.0, 4.0-6.0, 2.0-5.5, 2.5-5.5, 3.0-5.5, 3.5-5.5, 4.0-5.5, 2.0-5.0, 2.5-5.0, 3.0-5.0, 3.5-5.0, 4.0-5.0, 2.0-4.5, 2.5-4.5, 3.0-4.5, 3.5-4.5, 4.0-4.5, or variations thereof;

Nb having a range (in wt. %) from 1.5-4.0, 2.0-4.0, 2.5-4.0, 1.0-3.5, 1.5-3.5, 2.0-3.5, 2.5-3.5, 1.0-3.0, 1.5-3.0, 2.0-3.0, or 2.5-3.0, or variations thereof, and wherein the total Ta+Nb content has a range (in wt. %) from 3.5-7.0, 4.0-7.0, 4.5-7.0, 5.0-7.0, 3.0-6.5, 3.5-6.5, 4.0-6.5, 4.5-6.5, 5.0-6.5, 3.0-6.0, 3.5-6.0, 4.0-6.0, 4.5-6.0, 5.0-6.0, or 5.5-6.0, or variations thereof;

Al having a range (in wt. %) from 3.5-6.5, 4.0-6.5, 4.5-6.5, 3.0-6.0, 3.5-6.0, 4.0-6.0, 4.5-6.0, 3.0-5.5, 3.5-5.5, 4.0-5.5, or 4.5-5.5, or variations thereof;

Hf having a range (in wt. %) from 0.4-1.5, 0.6-1.5, 0.8-1.5, 0.2-1.2, 0.4-1.2, 0.6-1.2, 0.8-1.2, 0.2-1.0, 0.4-1.0, 0.6-10, or 0.8-1.0, or variations thereof;

Each of Ge and Si (independently) (in wt. %) from trace amount to 1.0, 0.2-1.0, 0.4-1.0, 0.6-1.0, trace amount to 0.8, 0.2-0.8, 0.4-0.8, 0.6-0.8, trace amount to 0.6, 0.2-0.6, or 0.4-0.6, or variations thereof;

Y having a range from trace amount to 0.2, 0.05-0.2, 0.1-0.2, trace amount to 0.1, 0.05-0.1, or variations thereof;

B having a range from trace amount to 0.015, 0.005-0.015, 0.010-0.015, 0-0.010, trace amount to 0.010, or 0.005-0.010, or variations thereof;

C having a range (in wt. %) from 0.05-0.2, 0.1-0.2, 0.01-0.15, 0.05-0.15, or 0.1-0.15, or variations thereof, or Re having a range (in wt. %) from 2.0-3.5, 2.5-3.5, 1.5-3.0, 2.0-3.0, or 2.5-3.0, or variations thereof.

The above variations, or their variations, can be combined in line with description of the alloy disclosed herein.

In one embodiment, the high gamma prime nickel-based superalloy comprises total amount of germanium and silicon within the range from 0.9 to 1.1 wt. %.

In another embodiment, the current superalloy is selected from among welding wire, welding powder, equiaxed or directionally solidified turbine engine component, repaired turbine engine component, and article produced by hot forming.

In another aspect of the present invention, a method of manufacturing a turbine engine component is provided, wherein it comprises a step of using the high gamma prime nickel-based superalloy of the present invention.

Herein, "manufacturing a turbine engine component" refers to the manufacturing from the raw material and/or repairing an old turbine engine component such that it can be used as a new one.

Turbine engine components and other articles manufactured from the invented superalloys with the preferable chemical composition are subjected to heat treatment, which is different from the heat treatment of R142 superalloy, which produce the best properties by annealing at 2300° F. for 2 hours followed by primary aging at 1975° F. for 4 hours and secondary aging at 1650° F. for 4 hours, and includes annealing within the temperature range from 2190° F. to 2290° F. for 1-2 hours, primary aging within the temperature range from 1975° F. to 2050° F. for 2-4 hours, and secondary aging within the temperature range from 1300° F. to 1500° F. for 16-24 hours aiming to maximize mechanical properties of the developed superalloy by the aging that results in a precipitation of γ' phase.

In an embodiment, manufacturing of turbine engine components by casting comprises an additional step of a hot isostatic pressure treatment of an ingot at a temperature of 2200-2290° F., pressure of 15-20 KSI (102.6-136.8 MPa) for 2-6 hours prior to annealing.

Manufacturing of turbine engine components as per another embodiment comprises at least two consecutive steps of the annealing of the ingot at 2190° F. to 2290° F. for 1-2 hours followed by the hot forming with the temperature range from 1500° F. to 1800° F. by a plastic deformation by 5-80% and final heat treatment that includes the primary aging of the turbine engine component at 1975-2050° F. for 2-4 hours and secondary aging at 1300-1500° F. for 16-24 hours.

To avoid a recrystallization of the turbine engine components manufactured by the hot forming, the service temperature of these turbine engine components is selected below of the temperature of the primary aging.

In accordance with the an embodiment, a method of manufacturing of turbine engine components comprising the step of a fusion welding preferably selected from among a laser beam, plasma arc, micro plasma, and electron beam and gas tungsten arc welding, by a melting and deposition of a powder mix comprising at least two dissimilar nickel and cobalt based powders in quantities of (70-80) wt. % and (20-30) wt. % respectively in a welding pool, wherein the nickel based powder comprises by wt. %:

Chromium from 6 to 8%,
Cobalt from 6 to 12%,
Molybdenum 1.3 to 1.6%,
Tungsten from 4.5 to 5%,
Tantalum from 2.0 to 6.000,
Niobium from 1 to 4.0%,
Tantalum plus Niobium from 3.0 to 7.0%,
Aluminum from 3.0 to 6.5%,
Hafnium from 0.2 to 1.5%,
Rhenium from 2.5 to 3%,
Germanium from 0 to 1.0%,
Silicon from 0 to 1%,
Yttrium for 0 to 0.2%,
Boron from 0 to 0.015%,
Carbon from 0.01 to 0.1%, and
Ni with impurities to balance, and And the cobalt based powder comprises by wt. %
Nickel from 10 to 18%,
Chromium from 19 to 21%,
Tungsten from 8 to 10%,
Aluminum from 3 to 6.5%,
Germanium from 0 to 1.000,
Silicon from 0 to 1%,
Yttrium from 0 to 0.450%,
Hafnium from 0 to 1.500
Niobium from 0 to 4%,
Carbon from 0.01 to 0.2% and
Co with impurities to balance;

By progressively moving and solidifying of the welding pool as per a preprogrammed welding path, thereby forming a welding bead with the chemical composing same as the superalloy of the present invention; post weld heat treatment selected from among the high isostatic pressure, annealing, aging or combination of the annealing and aging; machining to a required geometry, and non-destructive testing.

To execute an embodiment above, the powder mix is selected from among a pre-alloyed powder blend comprising the dissimilar nickel and cobalt based powders or nickel and cobalt based powders that are mixed in the welding pool directly during welding.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made, by way of example, to the accompanying drawings which show example embodiments of the present application, and in which.

Similar reference numerals may have been used in different figures to denote similar components.

Standard Acronyms and Major Definitions

Figure 1:
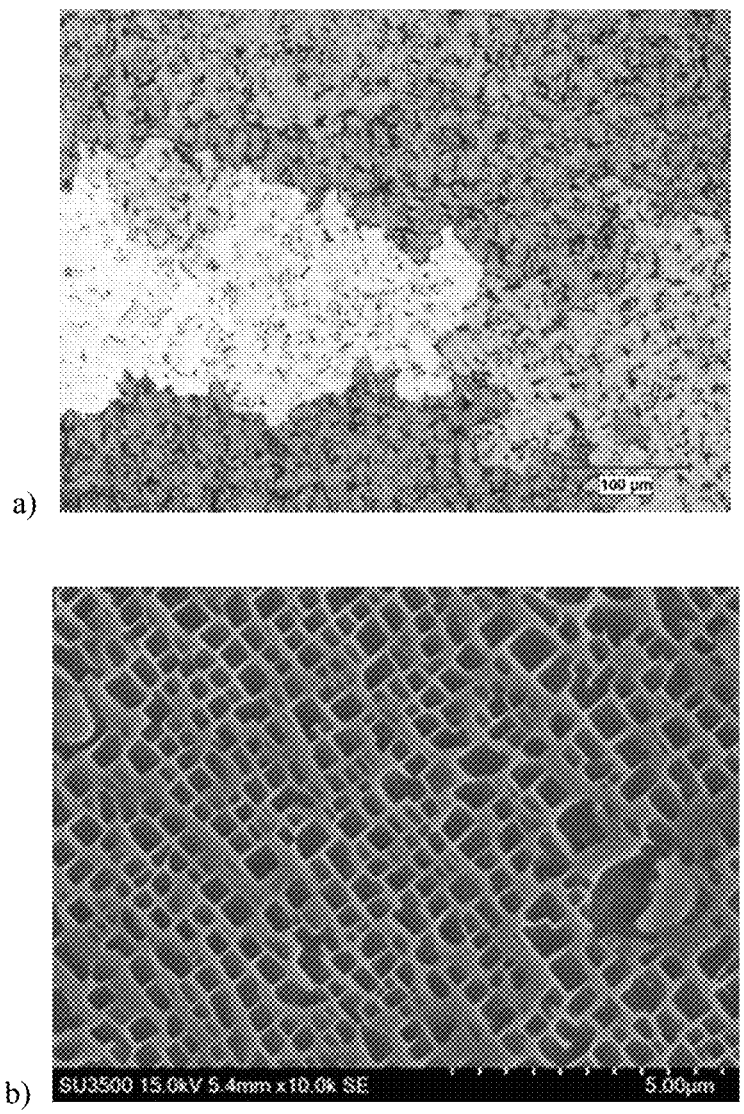
FIG. 1 is the microstructure of the invented cast superalloy in annealed and aged condition depicting: (a) Formation of zigzagged grains boundaries during solidification; (b) Precipitation of the cuboidal γ' phase during the aging heat treatment.

ASTM—American Society for Testing and Materials (standards)
HPT—High Pressure Turbine
LPT—Low Pressure Turbine
NDT—Non-Destructive Testing
NGV—Nozzle Gide Vane
PWHT—Post Weld Heat Treatment
UTS—Ultimate Tensile Strength
SRT—Stress Rupture Test
LBW—Laser Beam Welding
MPW—Micro-Plasma Welding
GTAW—Gas Tungsten Arc Welding
EBW—Electron Beam Welding
PAW—Plasma Arc Welding
SX—Single Crystal Material
BM—Base Material
3D AM—Three-Dimensional Additive Manufacturing
SEM—Scan Electron Microscope
EDS—Energy-Dispersive X-ray Spectroscopy
IPM—Inch per Minute
FPI—Fluorescent Penetrant Inspection Nickel Based Superalloys—are metallic materials that are used for a manufacturing of turbine engine components and other articles that exhibit excellent mechanical strength and resistance to creep (tendency of solid materials to slowly move or deform under stress) at high temperatures, up to 0.9 melting temperature; good surface stability, oxidation and corrosion resistance. Precipitation strengthening superalloys typically have a matrix with an austenitic face-centered cubic crystal lattice with precipitation of nickel-aluminum or titanium-aluminum based γ' phase. Superalloys are used mostly for manufacturing of turbine engine components.

Hot Forming—Hot forming, which is also known as a hot working, is a process in which a metal is shaped under pressure at a fairly high temperature at which material has sufficient ductility.

High Gamma Prime Nickel Based Superalloys—are nickel-based superalloys comprising from 3 wt. % to 12 wt. % either aluminum or titanium or total aluminum and titanium alloying elements.

Laser Beam (Electron Beam, Gas Tungsten Arc, and Plasma Arc) Welding—is a welding process that produces coalescence of materials with the heat obtained from the application of concentrated coherent light beam (electron beam or electric arc respectively) impinging upon the joint or base material with or without welding material.

Weldability—ability of a material to be welded under imposed conditions into a specific, suitable structure and to perform satisfactorily for its intended use.

Structural Turbine Engine Components—various cases, frames, nozzle guide vane rings and other stator parts that ensure engine integrity in service conditions.

Base Material—is the material of the engine components and test samples.

Energy-dispersive X-ray spectroscopy (EDS)—is an analytical technique used for the elemental analysis or chemical characterization of a sample.

DESCRIPTION OF EXAMPLE EMBODIMENTS

The invented material belongs to the precipitation strengthening high γ' superalloys and comprises high amount of aluminum, which is the major well-known gamma prime forming elements.

The unique combination of strength, ductility, oxidation resistance and weldability is attributed to a precipitation of large volume of high strength intermetallic gamma prime (γ') $Ni_3Al$, double gamma prime (γ") $Ni_3Nb$ phases, and Ta—Hf—W—Si cuboidal intermetallic particles shown in FIGS. 1b, 9, 10, and 11 in the austenitic ductile γ phase matrix, which is a solid solution of Co, Cr, Mo, W, Re in nickel, with optimized ratio of all alloying elements. It was found that the fraction volume of γ' and γ" phases in the invented superalloy exceeding 50 vol. % in the aged condition.

Ingots for the evaluation of mechanical properties of the invented superalloy were produced by a triple arc re-melt in argon followed by the annealing and aging heat treatment as per a particular embodiment.

Welding wire was manufactured by the multi-step extrusion of ingots at temperatures 1600-1800° F. followed by pickling for removing of surface oxidation.

Welding powder of 45 μm in diameter was produced by gas atomizing of ingots in argon.

To help maximize mechanical properties of the invented precipitation strengthening superalloy, heat treatment that includes the homogenization annealing within a temperature range from 2190° F. to 2290° F. for 1-2 hours, followed by the primary aging within a temperature range from 1975° F. to 2050° F. for 2-4 hours and the secondary aging within a temperature range from 1300° F. to 1500° F. for 16-24 hours, was developed. This heat treatment was different from the heat treatment frequently used for the heat treatment of R142 superalloy, refer to W. Ross and Kevin S. O'Hara for René 142 in "Rene 142: High Strength, Oxidation Resistance DS Turbine Airfoil Alloy", Superalloys 1992, pp. 257-265.

Parameters for PWHT heat treatment of turbine engine components depend on applications. In one embodiment, it was found that the heat treatment parameters for HPT, LPT NGV and other non-rotating components of turbine engines manufactured by casting and 3D AM comprises annealing within the temperature range from 2250-2290° F. for 2 hours followed by the primary aging at 1100-1120° F. for 2 hours and the secondary aging at a temperature of 1480-1500° F. for 24 hours.

PWHT parameters for the heat treatments of HPT and LPT turbine blades manufactured from single crystal superalloys and/or repaired by welding using the invented welding wire or welding powder includes primary and secondary aging with the temperature range from 1975° F. to 1995° F. for 4 hours and 1300° F. to 1325° F. for 16 hours respectively to avoid recrystallization of the base material. The heat treatment of turbine engine components manufactured from the invented superalloy by the hot forming comprises also only the primary and secondary aging using the above disclosed parameters to prevent recrystallization of the base material.

Service temperature of the turbine engine components manufactured from the invented superalloy by the hot forming was selected below the primary aging temperature, aiming to exclude recrystallization and degradation of mechanical properties of the base material in service conditions.

Annealing of ingots prior to extrusion or after manufacturing of turbine engine components by casting as per the preferable embodiment results in the homogenization while aging plays the key role in the formation of superior strength due to a precipitation of γ' phase. Further, preferable embodiments are explained in more details by examples.

Example 1

To demonstrate the unique combination of high strength and ductility of the developed superalloy, samples manufactured from René 142 (R142) and Merl 72 (M72), invented superalloy with the preferable embodiments (samples marked 4275A, 4275B, 4275C, and 4275D), and superalloy with the chemical composition deviated from the preferable embodiment (sample marked 427X) shown in Table 1, were produced by the triple arc re-melt in argon followed by the homogenization annealing at 2215-2230° F. for 2 hours, primary aging at 2035-2050° F. for 2 hours, and secondary aging at 1155-1170° F. for 24 hours.

Test specimens of 0.255-0.275 inch in diameter were machined from ingots and subjected to the radiographic examination as per ASTM E192-04. Linear indications and pores exceeding 0.002 inch in size were not permitted. Subsized test samples with the gauge diameter of 0.176-0.180 inch and 1.8 inch in length were machined as per ASTM E-8. Tensile tests were conducted as per ASTM E-21 at the temperature up to 1800° F.

Table 1

| Chemical Composition of Nickel Based Superalloys with Ni to Balance ||||||||||||||||
|---|---|---|---|---|---|---|---|---|---|---|---|---|---|---|---|
| Samples | Ni | Cr | Co | Ta | Al | W | Mo | Re | Hf | C | B | Y | Ge | Si | Nb |
| M72 | 15 | 20 | Bal | 3 | 4.4 | 9 | — | — | 1 | 0.35 | — | 0.45 | — | — | — |
| R142 | Bal | 6.8 | 12 | 6.3 | 6.1 | 4.9 | 1.5 | 2.8 | 1.2 | 0.12 | 0.015 | — | — | — | — |
| 4275A | Bal | 9 | 20 | 6.0 | 5.5 | 5.5 | 1.0 | 1.5 | 0.2 | 0.10 | 0.01 | 0.15 | — | 0.01 | — |
| 4275B | Bal | 10 | 21.5 | 5.4 | 6.0 | 5.0 | 1.2 | 2.5 | 1.2 | 0.12 | 0.01 | — | — | 0.12 | — |
| 4275C | Bal | 9.8 | 20.4 | 5.4 | 5.5 | 5.1 | 1.2 | 2.3 | 1.1 | 0.14 | 0.015 | 0.01 | 0.85 | — | — |
| 4275D | Bal | 10.2 | 22 | 2.0 | 4.2 | 5.5 | 1.2 | 3.5 | 1.5 | 0.12 | 0.01 | 0.1 | 0.2 | 0.8 | — |
| 4275E | Bal | 10.1 | 22 | 5.45 | 5.7 | 5.95 | 2 | 2.1 | 1.15 | 0.13 | 0.01 | 0.11 | — | 0.1 | — |
| 427X | Bal | 10 | 26 | 5.5 | 6.2 | 5.4 | 1.4 | 2.0 | 1.1 | 0.12 | 0.01 | 0.1 | — | — | — |
| 4287 | Bal | 10 | 18 | 2 | 6.2 | 5.6 | 1.2 | 2.2 | 0.3 | 0.1 | 0.015 | — | — | 0.5 | 4 |

Solidification of ingots resulted in the formation of zig-zagged grains boundaries shown in FIG. 1a, which enhances mechanical properties of the developed superalloy. The post weld (PWHT) aging heat treatment results in the precipitation of high volume of γ' phase shown in FIG. 1b.

Precipitation of a large volume of high strength γ' phase in the ductile austenitic matrix results in a formation of the desirable combination of high strength and ductility as shown in Table 2. Ductility (elongation) of the invented superalloy is superior to the ductility of standard R142 samples while strength is superior to M72.

TABLE 2

Mechanical Properties of Ingots Produced by Arc Triple Re-Melt in Argon

| Material | Test Temp. °F. | UTS, KSI | 0.2% Yield Strength, KSI | Elong. % |
|---|---|---|---|---|
| M72 | 1800 | 23.1 | 15.7 | 86.8 |
| R142 | 1800 | 71.2 | 70.5 | 1.0 |
| 4275A | 70 | 172.1 | 142.0 | 7.0 |
| 4275A | 1450 | 136.7 | 125.8 | 8.6 |
| 4275A | 1600 | 113.3 | 93.1 | 6.9 |
| 4275A | 1800 | 70.9 | 61.7 | 9.8 |
| 4275B | 1800 | 71.5 | 68.5 | 5.0 |
| 4275D | 1800 | 63.6 | 55.0 | 14.0 |
| 427X | 1800 | 43.7 | 37.8 | 18.2 |

Example 2

Low γ' wrought AMS 5664 Inconel 718 (IN718) and AMS 5704 Waspaloy superalloys have been used for the manufacturing of structural turbine engine components due to high strength at the temperature up to 1200° F. and good workability. However, further heating of IN718 and Waspaloy to 1800° F. drastically reduced strength and stress rupture properties (SRT) of these superalloys as shown in Table 3.

Due to a good combination of strength at the temperature up to 1800° F. and workability of the developed high gamma prime superalloys, it is found that the developed high gamma prime superalloys are most prominent for a substitution of standard wrought superalloys for a manufacturing of structural turbine engine components utilizing hot forming processes. To evaluate mechanical properties of the invented superalloy in wrought (hot formed) condition, ingots were subjected to the extrusion as per the preferable embodiment to produce bars of 0.225 inch in diameter, which further were subjected to the primary aging at the temperature of 1950° F. for 4 hours and secondary aging at 1300° F. for 24 hours.

The subsized test samples of 1.8 inch in length with the gauge diameter of 0.158-0.162 inch were machined as per ASTM E-8. Tensile tests were conducted as per ASTM E-8 at 70° F., and as per ASTM E-21 at 1200° F. and 1800° F. The stress rupture testing was conducted at temperatures of 1200° F., 1350° F., and 1800° F. as per ASTM E-139.

Figure 2:
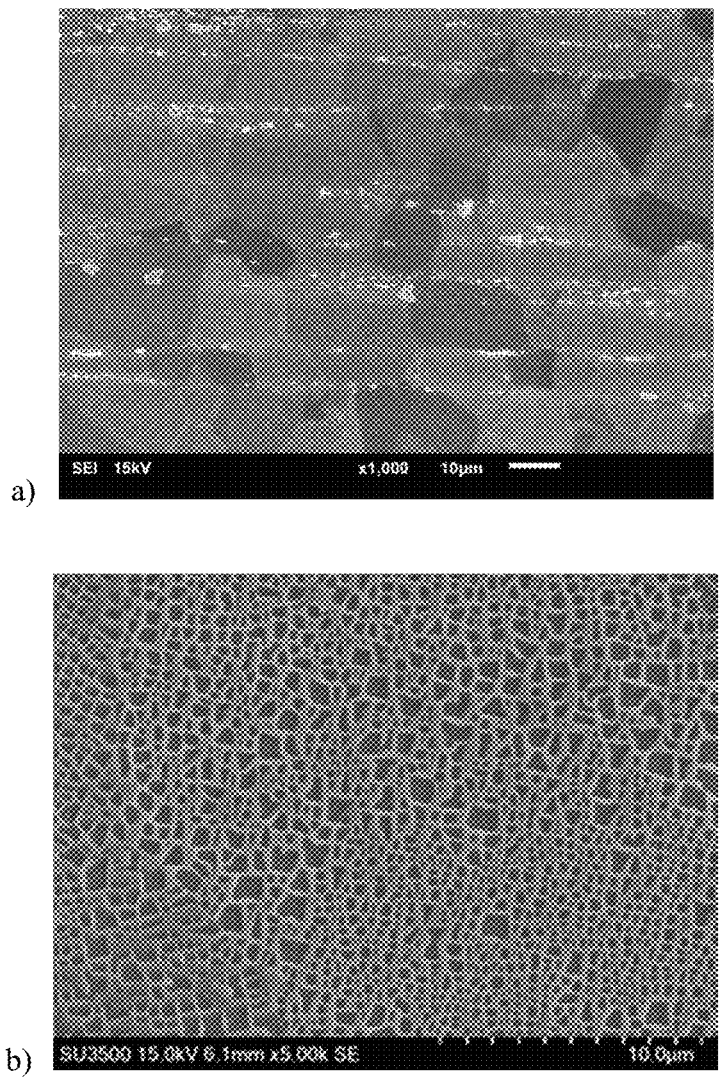
FIG. 2 is the microstructure of the extruded rods in the aged condition depicting: (a) Formation of equiaxed grains with straight boundaries during extrusion and primary recrystallization; (b) Precipitation of the γ' phase during the aging heat treatment.

Extrusion of the invented superalloy at high temperature resulted in a formation of the equiaxed structure with the straight grain boundaries shown in FIG. 2a, which were different from zigzagged boundaries formed during the solidification of ingots shown in FIG. 1a. The primary aging heat treatment resulted in a precipitation of γ' phase shown in FIG. 2b.

As it was found by experiments, UTS and SRT properties of the developed superalloy were superior to UTS and SRT of Inconel 718 and Waspaloy up to 1800° F. as shown in Table 3 and 4 respectively.

TABLE 3

Tensile Properties of Wrought (Hot Formed by Extrusion) Superalloys

| Material | Test Temp. °F. | UTS, KSI | 0.2% Yield Strength, KSI | Elongation. % |
|---|---|---|---|---|
| Inconel 718 | 70 | 186.3 | 161.2 | 12.5 |
|  | 1200 | 162.5 | 138 | 10.5 |
|  | 1800 | 15.7 | 8.5 | 67.9 |
| Waspaloy | 70 | 195.7 | 168.3 | 16 |
|  | 1200 | 186.4 | 139.5 | 20.4 |
|  | 1800 | 30.1 | 21.5 | 49.9 |
| 4275A | 70 | 182.5 | 155.6 | 10.5 |
|  | 1200 | 174.2 | 145.7 | 11.0 |
|  | 1800 | 59.6 | 43.3 | 5.1 |

TABLE 4

SRT Properties of Hot Formed (Extruded) Rods

| Material | Test Temp. °F. | Stresses, KSI | Time to Rupture, Hours |
|---|---|---|---|
| Inconel 718 | 1200 | 100 | 28 |
|  | 1800 | 15 | 1.4 |
| Waspaloy | 1350 | 80 | 26.5 |
|  | 1800 | 15 | 4.3 |
| 4275A | 1200 | 100 | 232 |
|  | 1350 | 80 | 447.8 |
|  | 1800 | 15 | 31.2 |

Combination of high strength, ductility and workability makes the invented superalloy most prominent for a manufacturing of turbine engine components by the hot forming.

Example 3

To simulate the repair of turbine engine components manufactured from single crystal materials using manual GTAW and automatic LBW welding, test samples were produced using the developed superalloy in a form of welding wire and welding powder respectively, and using standard René 142 welding wire for GTAW with preheating to 1700-1800° F. and LBW at an ambient temperature.

Figure 3:
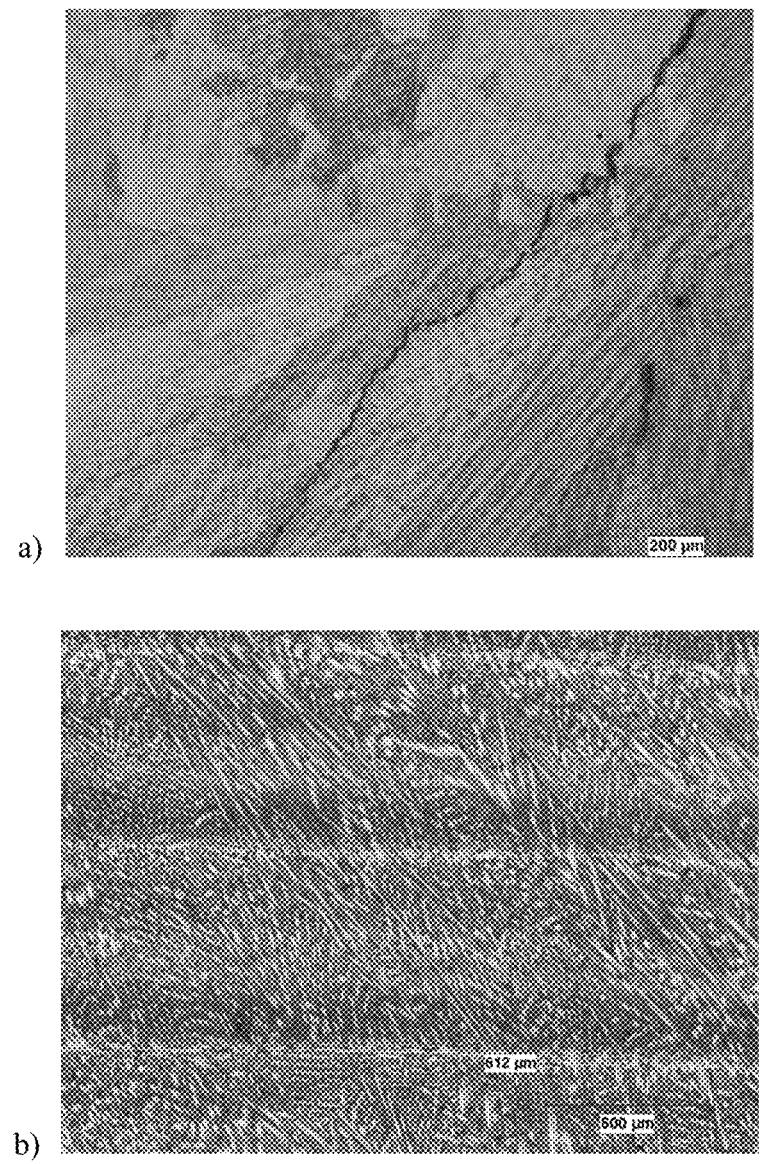
FIG. 3 is the microstructure of LBW welds produced at a room temperature depicting: (a) Formation of micro cracks in René 142 weld produced using GTAW welding with preheating to 1700-1800° F.; (b) The defect free multilayer weld buildup produced at an ambient temperature using LBW with the welding powder manufactured from the invented superalloy.

Preheating was used for GTAW with René 142 welding wire to produce samples for tensile and SRT testing because welding at an ambient temperature results in extensive cracking of René 142 welds as shown in FIG. 3a.

Multi pass LBW with welding powder manufactured from the invented superalloys and GTAW with welding wire manufactured from the invented superalloys were performed at an ambient temperature so as to produce weld samples marked LBW4275 and GTAW4275. Welds were free of cracks. Typical microstructure of these samples is shown in FIG. 3b and FIG. 4a.

Figure 4:
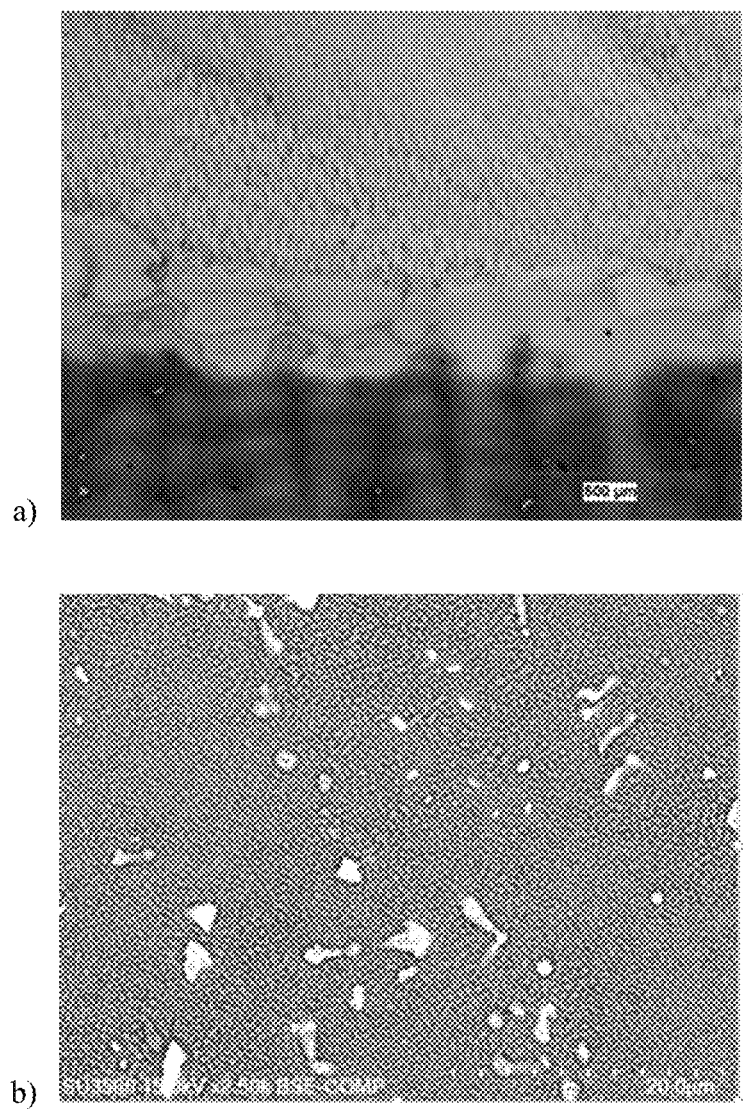
FIG. 4 is the microstructure of the defect free multilayer weld buildup produced using the LBW at an ambient temperature on the PWA1484 SX substrate (base metal) wherein: (a) The crack free fusion of weld and base metals in as welded condition; (b) Precipitation of the γ' phase in the weld metal after the PWHT aging heat treatment.

The post weld heat treatment of welds included the homogenization annealing at 2200° F. for two hours followed by the primary aging at 1975-1995° F. for 4 hours and the secondary aging at 1300-1320° F. for 16 hours to exclude recrystallization of HPT blades manufactured from the PWA1484 SX material, which resulted in a precipitation of γ' phase shown in FIG. 4b with the fraction volume of 49.2 vol. %.

Flat subsized 'All Weld Metal' samples of 0.050 inch in thickness were produced as per ASTM E-8 and subjected to the tensile testing at 1800° F. as ASTM E-21 and SRT at 1800° F. and stresses of 22 KSI as per ASTM E-139.

TABLE 5

Tensile and Creep Properties of Rene 142 and 4275 Weld Metals

| Weld Method and Sample ID | Test Temp. °F. | UTS, KSI | 0.2% Yield Strength, KSI | Elong. % | Time to Rupture in Hours |
|---|---|---|---|---|---|
| GTAW R142 | 1800 | 34.8 | 34.0 | 2.7 | 24.2 |
| LBW4275B | 1800 | 71.7 | 52.6 | 6.5 | 278.5 |
| GTAW4275B | 1800 | 67.5 | 53.8 | 8.7 | 216.8 |

As follows from Table 5, ductility and SRT properties of LBW and GTAW welds produced from the invented superalloy were superior to properties of standard René 142 welds.

Low tensile and SRT properties of René 142 welds were attributed to a formation of microcracks shown in FIG. 3a.

Figure 5:
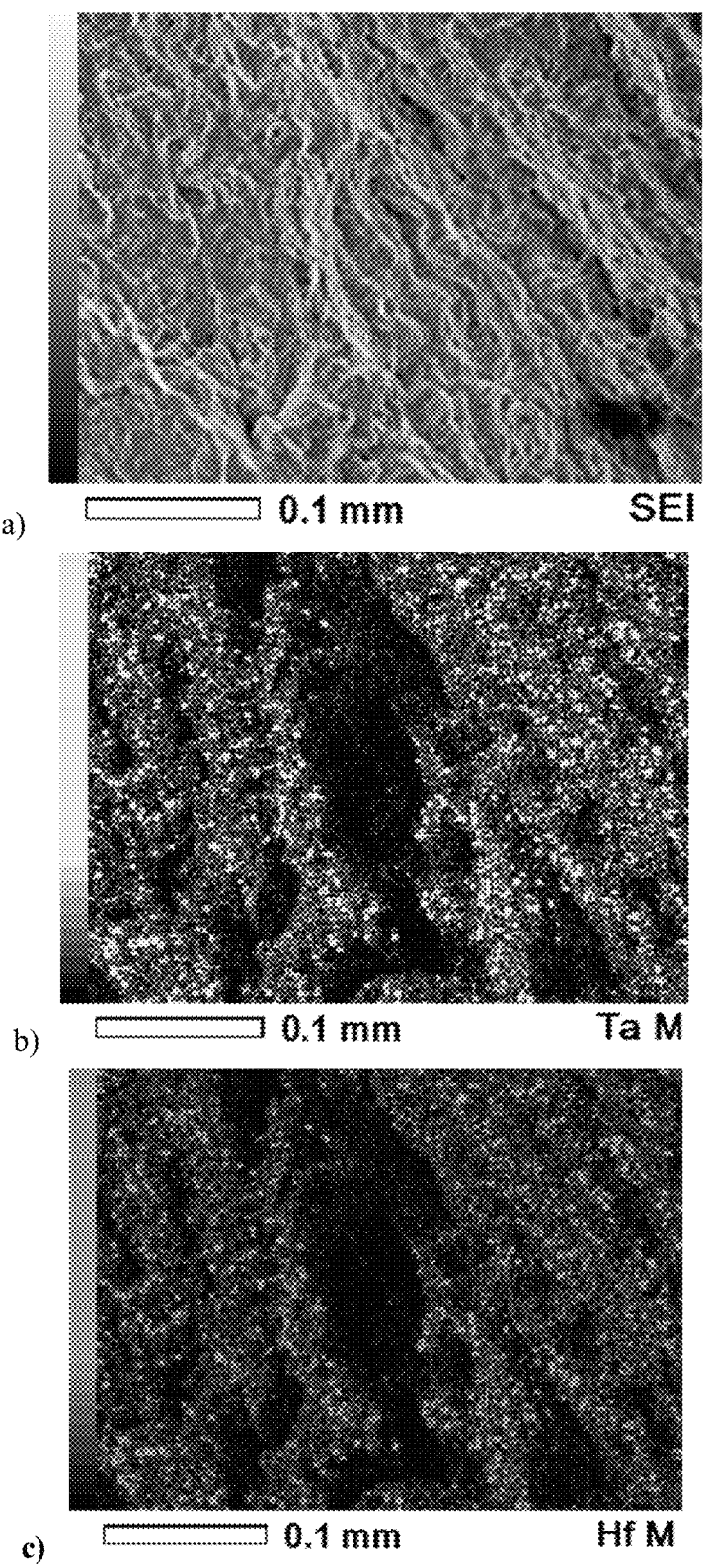
FIG. 5 is the fracture and EDS mapping (distribution) of some alloying elements in the tensile sample manufactured from the weld metal depicting interdendritic precipitation of fine cuboidal Ta—Hf based intermetallic particles: (a) Ductile fracture of the weld metal tensile test sample produced using SEM; (b) Distribution of tantalum; (c) Distribution of hafnium.
Figure 6:
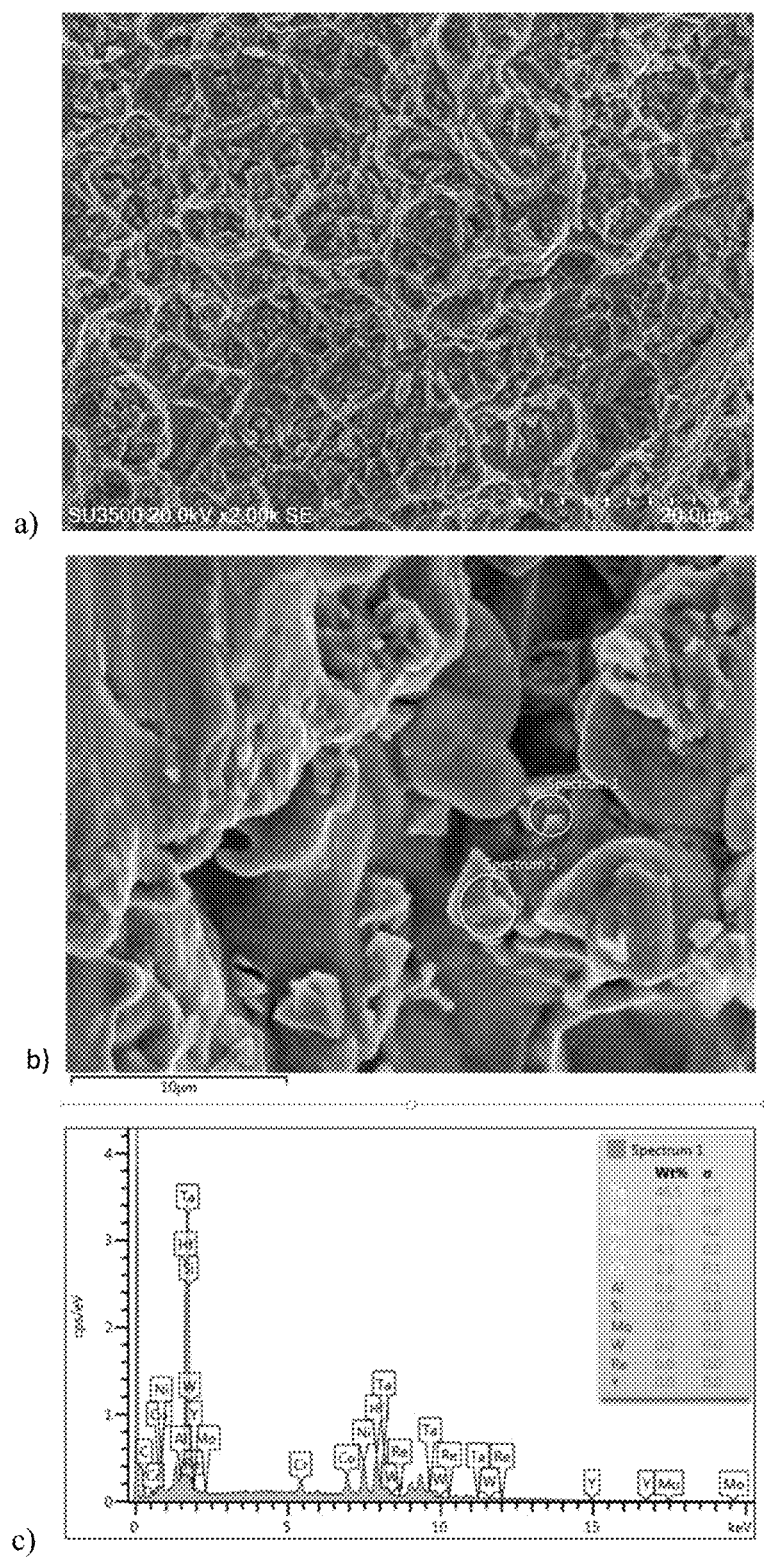
FIG. 6 is the fractography tensile test sample manufactured from the germanium free embodiment of the invented superalloy wherein: (a) Fractograph depicting the ductile dimple fracture of the tensile sample and cuboidal Ta—Hf based intermetallic particles at the bottom of dimples; (b) The same as a) with higher magnification depicting selecting and marking of typical particles (Spectrum 1 and 2) for EDS; (c) Chemical analysis of the particle marked Spectrum 1 and chemical composition of the selected particle comprising 46.5% Ta-37.3% Hf-9.5% Ni-4.1% Co-1.8% Cr.

High tensile and creep properties, as well as good ductility and weldability of the developed superalloy, were attributed to the precipitation of high volume of high strength cuboidal γ' phase in the ductile Ni—Cr—Co—Re—W—Mo solid solution of gamma matrix and interdendritic precipitation of fine cuboidal Ta—Hf based intermetallic particles shown in FIGS. 5 and 6.

Example 4

Figure 7:
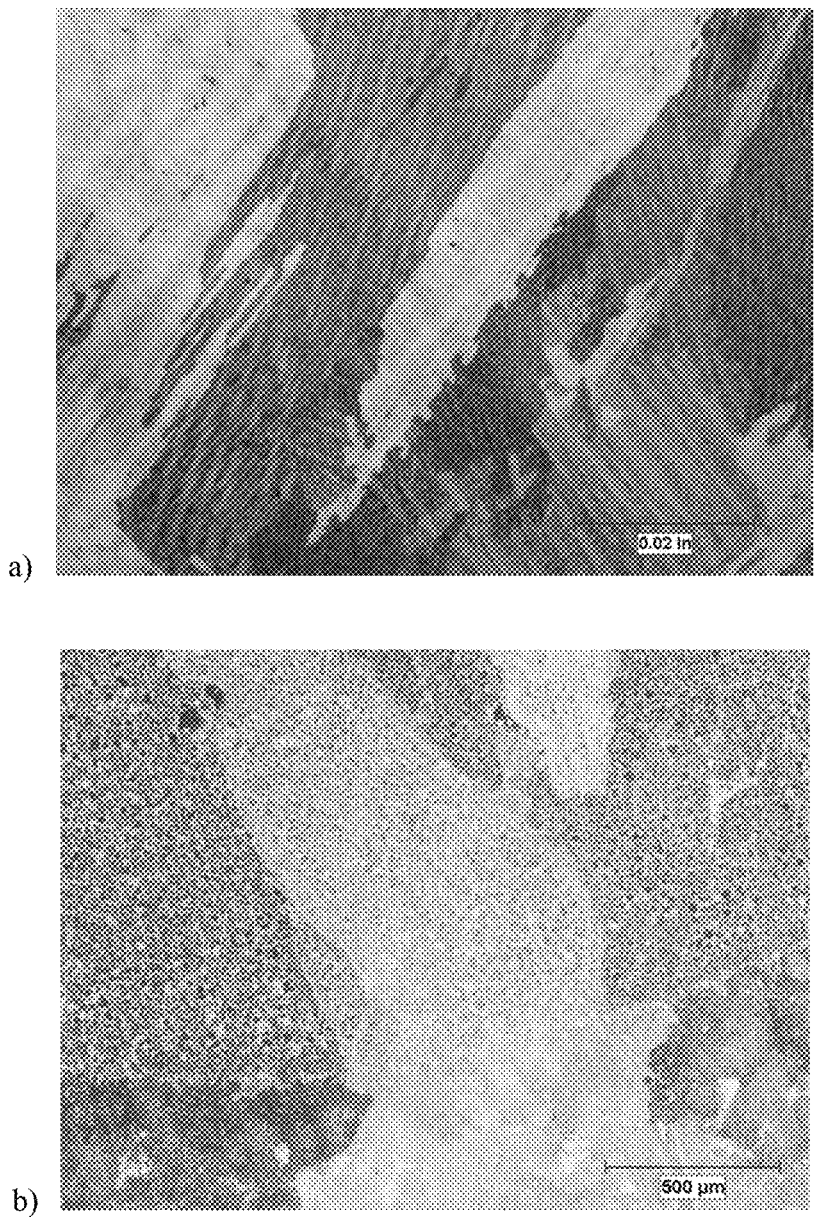
FIG. 7 is the microstructure of the weld produced using the invented superalloy on the René 80 substrate wherein: (a) Dendritic structure formed in the weld in 'as welded' condition; (b) Microstructure of the weld metal and base material adjacent to the fusion line after the annealing and aging PWHT as per the preferable embodiment.

Germanium has not been used for a manufacturing of Ni based superalloys despite that nickel based brazing material comprising Ni-(5-40) wt. % Cr-(15-40) wt. % Ge as per the U.S. Pat. No. 2,901,374 was invented in 1954. Despite that germanium is the melting point depressant that should affect high temperature strength, we discovered that the addition of up to 0.85 wt. % of germanium to the invented superalloys, which was marked 4275C in Table 1, improves weldability and produced defect free welds on the René 80 as shown in FIG. 7.

Welding of test samples was done manually with the weld current of 75-80 A, voltage of 9-10 V and welding speed of 1-1.2 ipm (inch per min). After welding, samples were subjected to heat treatment that included annealing at 2190° F. for 2 hours, primary aging at 1975° F. for 2 hours followed by the secondary aging at 1550° F. for 16 hours. The tensile samples for testing were machined as per ASTM E-8 from the base material and weld, and subjected to tensile testing at 1800° F.

The weld metal was also subjected to the semi guided bend test as per ASTM E-190 at an ambient temperature.

In addition to above, the cylindrical samples manufactured from the René 80 and invented superalloy were subjected to the cyclic oxidation testing at 2050° F. in 500 hours. Duration of each cycle was 1 hour that included exposure to 2050° F. for 50 min followed by cooling to about 700° F. and reheating to 2050° F. for 10 min.

As it was found by experiments, the strength and oxidation resistances of welded joints and weld metal were superior to the René 80 base material as shown in Tables 6A and 6B.

TABLE 6A

Tensile Properties of the René 80 and Invented Superalloy

| Weld Method, and Material | Test Temp. °F. | UTS, KSI | 0.2% Yield Strength, KSI | Elong. % |
|---|---|---|---|---|
| René 80 | 1800 | 55.3 | 45.3 | 16.5 |
| René 80—4275C Dissimilar Welded Joint | 1800 | 61.8 | 48.1 | 12.2 |

TABLE 6B

Oxidation Properties of the René 80 and. Invented superalloy at 2050° F

| Weld Method, and Material | Weight Lost in gram after exposure in air for 200 hours |
|---|---|
| René 80 | 3.1583 |
| 4275C Weld Metal | 0.0028 |

Figure 8:
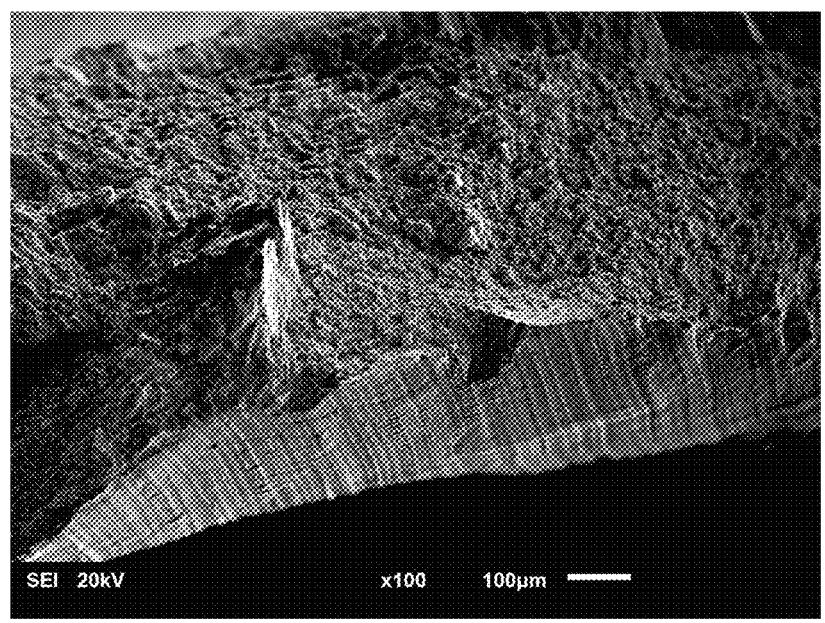
FIG. 8 is the fractograph of the weld metal test sample subjected to the bend test at an ambient temperature depicting the ductile fracture of the sample.
Figure 9:
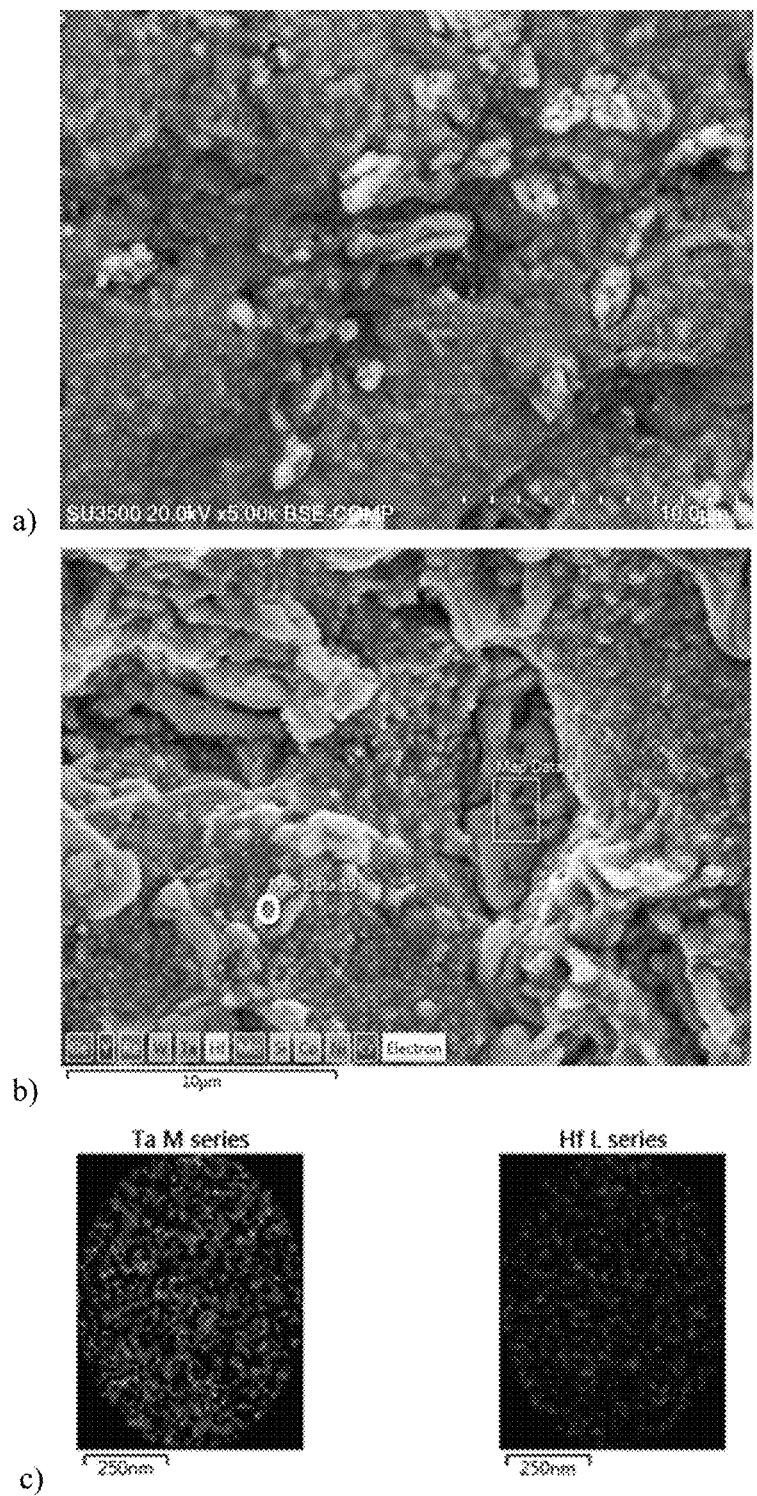
FIG. 9 is the fractograph of the weld sample manufactured from the invented embodiment of the invented superalloy comprised of 0.85 wt. % germanium and subjected to the tensile testing at 1800° F. depicting: (a) Alternation of a morphology of Ta—Hf based intermetallic particles; (b) Same as a) at higher magnification with the selection of typical Ta—Hf particles for EDS; (c) Mapping of Ta and Hf on the surface of the particle marked Map Data 19 in FIG. 9a depicting significant enrichment of this particle with Ta and Hf.
Figure 10:
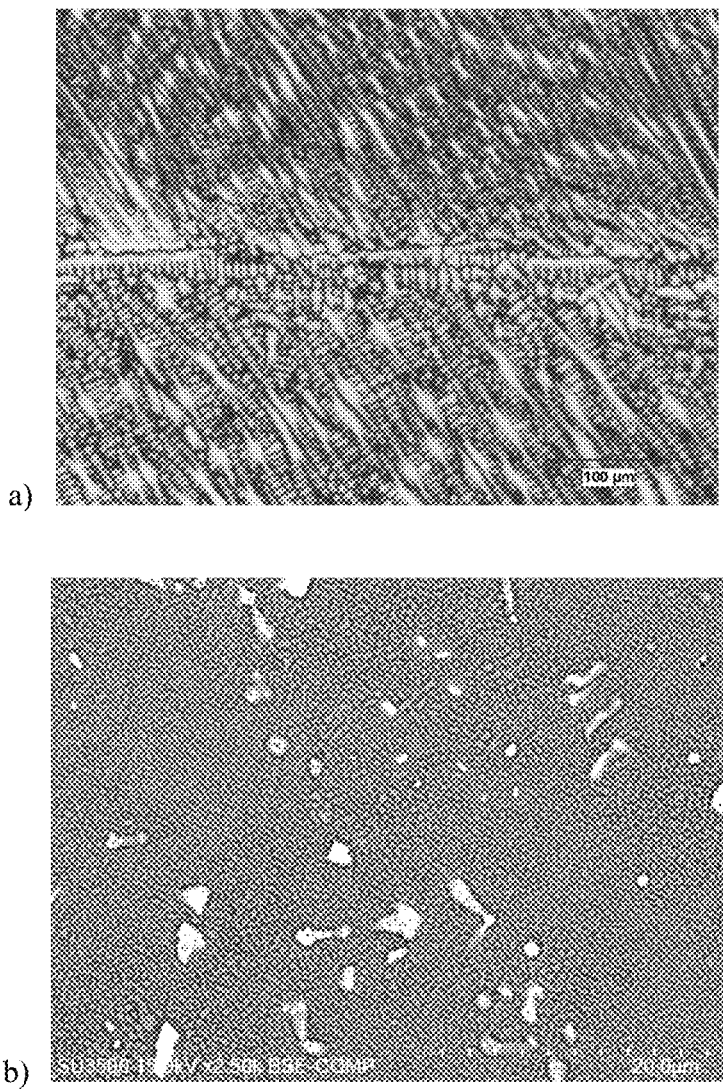
FIG. 10 is the microstructure of LBW weld produced using the powder blend comprising dissimilar nickel and cobalt based powders depicting: (a) Formation of dendritic structure during solidification of a welding pool; (b) Dissolution of dendrites during the homogenizing annealing followed by the aging as per the preferable embodiment.
Figure 11:
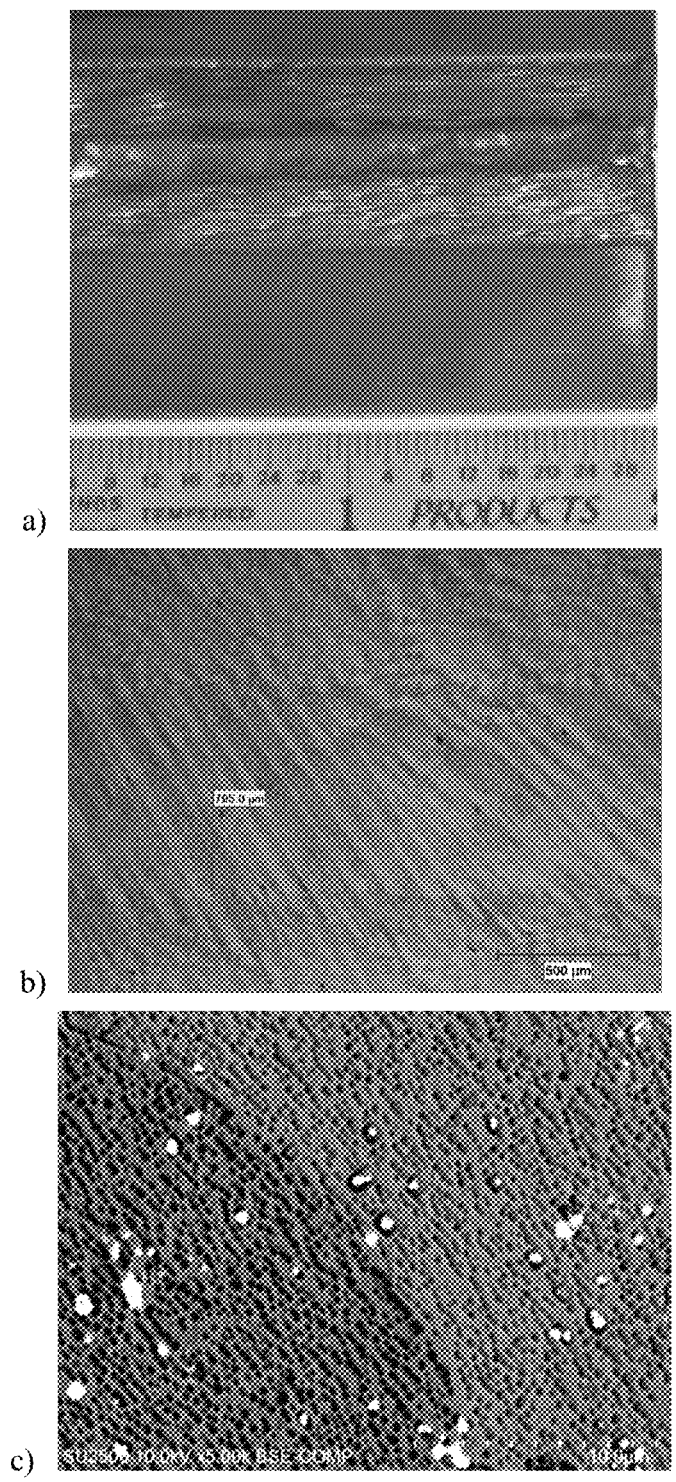
FIG. 11 is the weld sample manufactured from the alloy 4285 described in the Example 6 utilizing LBW and 3D AM concept depicting: (a) Manual butt GTAW weld of test samples produced by LBW; (b) Epitaxial dendrite growth in multi pass LBW welds and typical thickness of the LBW weld deposits of 795 μm per pass; (c) Precipitation of cuboidal gamma prime and double gamma prime phases during post weld heat treatment of the GTAW weld joint.

Bend samples produced from the weld metal fractured approximately at 90°, demonstrating unique ductile of the invented superalloy as shown in FIG. 8 that was not reported on any welds produced on known high γ' superalloys. As it was found by experiments, germanium enhances bonding between Ta—Hf intermetallic particles and changes morphology of these particles as shown in FIG. 6a and FIG. 9a respectively. The EDS analysis confirmed that particles were produced by Ta—Hf based intermetallic compound, refer to FIGS. 9b and 9c. This effect was unknown because on the contrary to Si, which belongs to the same IVA group of chemical elements, germanium within the specified range does not result in the formation of the intergranular and interdendritic Ni—Ge based eutectics that affect mechanical properties of Si bearing nickel-based superalloys.

Therefore, superior mechanical properties of the Ge-bearing embodiment of the invented superalloy were achieved by the combination of high content of γ' phase, and strengthening of grain and dendrites boundaries by fine Ta—Hf based intermetallic particles with coherent bonding with the ductile Ni—Cr—Co—Re—Mo—W based matrix shown in FIG. 9a, and peculiarities of a solidification of a welding pool, which is produced by the dissimilar nickel and cobalt based powders that are melted together in the welding pool and then solidified, produces properties of welds superior to properties of welds produced by using homogeneous welding powders and wires. Oxidation resistance was enhanced by the optimized content of Cr, Al, Si in a combination with Ge and all other alloying elements of the invented superalloy.

Based on the test results, the welding wire and powders manufactured from the invented superalloy were found most prominent for the tip repair of HPT and LPT blades, ensuring the optimal clearance between the tip of blades and stator, low fuel consumption, and high efficiency of turbine engines through the full engine cycle between overhauls.

Example 5

To demonstrate 3D AM process for a manufacturing of turbine engine components, samples of 4 inch in length by 1 inch in height and 0.125 inch in thickness were produced, using the LAWS1000 laser welding system equipped with 1 kW IPG laser and two powder feeders allowing mixing of two dissimilar nickel and cobalt based dissimilar powders directly in the welding pool as well as performing welding using the pre-alloyed powder blend.

The example below is depicting welding with the pre-alloyed powder blend that comprises 75 wt. % of the nickel based powder and 25 wt. % of the cobalt based powder. The nickel-based powder comprises 6.8 wt. % Cr, 12 wt. % Co, 1.5 wt. % Mo, 4.9 wt. % W, 6.3 wt. % Ta, 6.1 wt. % Al, 1.2 wt. % Hf, 2.8 wt. % Re, 0.1 wt. % Si, 0.12 wt. % C, 0.01 wt. % B, and Ni to balance. The cobalt based powder comprises 17 wt. % Ni, 20 wt. % Cr, 3 wt. % Ta, 9 wt. % W, 4.4 wt. % Al, 0.45 wt. % Y, 0.1 wt. % Si, 0.015 wt. % C and Co to balance.

Welding parameters that were used to produce samples are provided below:
Laser beam power—480 W (Watt)
Deposition rate—3.8 g/min (gram per min)
Welding speed—3.5 ipm (inch per min)
Beam oscillation speed across the weld—40 imp
Inert gas—argon During multi pass weld deposition, the welding pool was moved progressively as per the preprogrammed welding path with the speed of 3.5 ipm, which, due to solidification, results in the formation of a welding bead with the preferable chemical composition that is same as that of the invented superalloy. Chemical composition of the weld metal sample marked 4275E is provided in Table 1.

After welding test, samples were subjected to the primary aging at 2035-2050° F. for 2 hours, and secondary aging at 1155-1170° F. for 24 hours, machining to a required geometry followed by a non-destructive testing that includes FPI as per AMS 2647 and radiographic inspection as per ASTM E192-04. Weld discontinuities that exceeds 0.002 inch in size were not permitted.

Subsized test samples were produced from welds as per ASTM E-8 and subjected to tensile testing at 1775° F. as per ASTM E-21.

Welding resulted in a formation of dendritic structure with the epitaxial grain growth as shown in FIG. 10a. Welds were free of cracks and other weld discontinuities.

The post weld homogenizing and aging heat treatment resulted in precipitation of large volume of gamma phase as shown in FIG. 10b.

TABLE 7

Tensile and SRT Properties of Welds Produced by LBW with the Powder Blend

| Weld Metal Sample ID | Test Temp. ° F. | UTS, KSI | 0.2% Yield Strength, KSI | Elong. % |
|---|---|---|---|---|
| 4275E | 1775° F. | 74.8 | 63.5 | 7.4 |

As follows from the Table 7, weld samples demonstrate excellent strength and good ductility at a temperature of 1775° F., despite the balk content of Al in weld metal of 5.7 wt. %.

Superior weldability, strength and ductility of the invented superalloy that comprises 5.7 wt. % of aluminum were achieved by the peculiarities of a solidification of the welding pool produced by the dissimilar nickel and cobalt based powders.

Known nickel-based superalloys comprising 5.7 wt. % Al are not weldable at an ambient temperature, while LBW welding using the mix of dissimilar powders and/or powder blends, which due to a solidification of a welding pool forms welds with the balk chemical composition corresponding to the chemical composition of the invented superalloy, produces sound welds with high mechanical properties.

Example 6

To simulate the repair of turbine engine components manufactured from Rene N5 single crystal (SX) material, LBW welding at an ambient temperature was performed on the SX substrate using the powder blend of 78-80% Ni-based powder 'A' and 20-22% of Co-based powder 'B' comprising:
Powder A: Ni-8% Cr-8% Co-1.5% Mo-4.5% W-3.5% Ta-6% A-0.75% Hf-0.15% Si-3.5% Re-1.2% Nb-0.012% B-0.1% C
Powder B: Co-18% Cr-15% Ni-10% W-0.05% Hf-3.5% A-0.15% Si-0.1% C Dissimilar Ni based powder A and cobalt based powder B were melted by the laser beam in a welding pool producing a homogeneous alloy. Due to a solidification of a welding pool the welding bead with the bulk chemical composition below (material 4285) was formed:
Material 4285: Ni-10% Cr-16% Co-1.2% Mo-5.6% W-2.8% Ta-1% Nb-5.5% Al-0.5% Hf-0.15% Si-0.01% B-0.1% C-2.2% Re After welding, test samples produced by LBW utilizing 3D AM concept were subjected to the primary aging at 1975° F. for 4 hours followed the secondary aging at 1650° F. for 4 hours.

After welding and heat treatment, samples were subjected to metallographic and radiographic examinations. No cracks and other weld discontinuities were found.

Subsized tensile specimens were machined from the weld samples and subjected to the tensile testing at an ambient temperature to demonstrate high ductility of the developed material as per ASTM E-8 alloy. Tensile properties of 4285 all weld metal samples are provided below:
UTS=187.2 KSI
0.2% Yield Strength=173.4 KSI
Elongation=11.2%

Additional test was carried out on the evaluation of weldability of 4285 material As it was found by experiments, GTAW welds produced using manual welding at an ambient temperature on 4285 material produced by automatic LBW were free of weld discontinuities as shown in FIG. 11a.

Multi pass LBW welding resulted in a formation of the dendritic structure and epitaxial grain growth as shown in FIG. 11b.

Post weld heat treatment resulted in a precipitation of the formation of fine γ' $Ni_3Al$, double gamma prime γ'' $Ni_3Nb$ and intermetallic Ta—Hf—W—Si strengthening phases in a ductile austenitic matrix of the GTAW weld metal as shown in FIG. 11c enhancing ductility, weldability and high strength of the invented superalloy.

GTAW butt welded joints shown in FIG. 11a at demonstrated high strength at 1400° F.:
UTS=142.1 KSI
0.2% Yield Strength=132.9 KSI
Elongation=5.2%

Good weldability, high ductility, and enhanced strength of the 4285 superalloy were attributed to the optimized with the range from 3 to 7 wt. % of the total content of Ta and Nb in the invented superalloy.

Example 7

To simulate the repair of turbine engine components manufactured from Rene N5 SX material, LBW welding at an ambient temperature was performed on the SX substrate using the powder blend of 70-72% of Ni-based powder 'C' and 28-30% of Co-based powder 'D' comprising:

Powder C: Ni-6% Cr-6% Co-1.7% Mo-5.6% W-3.4% Ta-4% Nb-6.2% A-0.3% Hf-0.5% Si-3% Re-0.02% B-0.1% C Powder D: Co-21% Cr-5.6% W-4% Nb-6.2% A-0.3% Hf-0.5% Si-0.1% C.

The welding bead with the bulk chemical composition of the material 4287 below was formed due to a solidification of a welding pool:

Material 4287 comprises:

Ni-10% Cr-18% Co-1.2% Mo-5.6% W-2% Ta-4% Nb-6.2% A-0.3% Hf-0.5% Si-0.015% B-0.1% C-2.2% Re

The post weld heat treatment of welds included the primary aging at 1975° F. for 4 hours followed by the secondary aging at 1650° F. for 4 hours.

After welding and heat treatment samples were subjected to metallographic and radiographic examinations. No cracks and other weld discontinuities were found.

Subsized tensile specimens were machined from the weld samples as per ASTM E-8 and subjected to the tensile testing at 1800° F. as per ASTM E-21. Tensile properties of 4287 all weld metal samples are provided below:

UTS=63.6 KSI 0.2% Yield Strength=49.3 KSI

Elongation=14.5%

While the invention has been described in terms of preferable embodiments, it is apparent that other forms of the current invention could be adopted by one skilled in the art. Therefore, the scope of the invention is to be limited only by the claims herein.

Certain adaptations and modifications of the described embodiments can be made. Therefore, the above discussed embodiments are considered to be illustrative and not restrictive.

What is claimed is:

1. A gamma prime nickel-based superalloy, comprising by wt. %:

Chromium from 9.0 to 10.5%,
Cobalt from about 16 to 22%,
Molybdenum from 1.0 to 1.4%,
Tungsten from 5.0 to 5.8%,
Tantalum from 2.0 to 6.0%,
Niobium from 2.2 to 4.0%,
Tantalum plus Niobium from 4.2 to 7.0%,
Aluminum from 3.0 to 6.5%,
Hafnium from 0.2 to 1.5%,
Germanium from 0 to 1.0%,
Yttrium from 0 to 0.2%,
Silicon from 0.2 to 1.0%,
Boron from 0 to 0.015%,
Carbon from 0.01 to 0.2%,
Rhenium from 1.5 to 3.5%, and
Nickel with impurities to balance.

2. The gamma prime nickel-based superalloy according to claim 1 wherein the total content of germanium and silicon is within 0.9-1.1 wt. %.

3. A use of the gamma prime nickel-based superalloy according to claim 1 as the material for a welding wire, welding powder, or turbine engine components.

4. A gamma prime nickel-based superalloy as per claim 1, comprising by wt. %:

Chromium from 9.5 to 10.5%,
Cobalt from about 17 to 19%,
Molybdenum from 1.1 to 1.3%,
Tungsten from 5.0 to 5.8%,
Tantalum from 1.5 to 2.5%,
Niobium from 2.5 to 4.0%,
Tantalum plus Niobium from 5.0 to 6.0%,
Aluminum from 6.0 to 6.5%,
Hafnium from 0.3 to 0.5%,
Silicon from 0.4 to 0.8%,
Boron from 0.01 to 0.015%,
Carbon from 0.01 to 0.12%,
Rhenium from 2.0 to 2.5%, and
Nickel with impurities to balance.

* * * * *